UNITED STATES PATENT OFFICE.

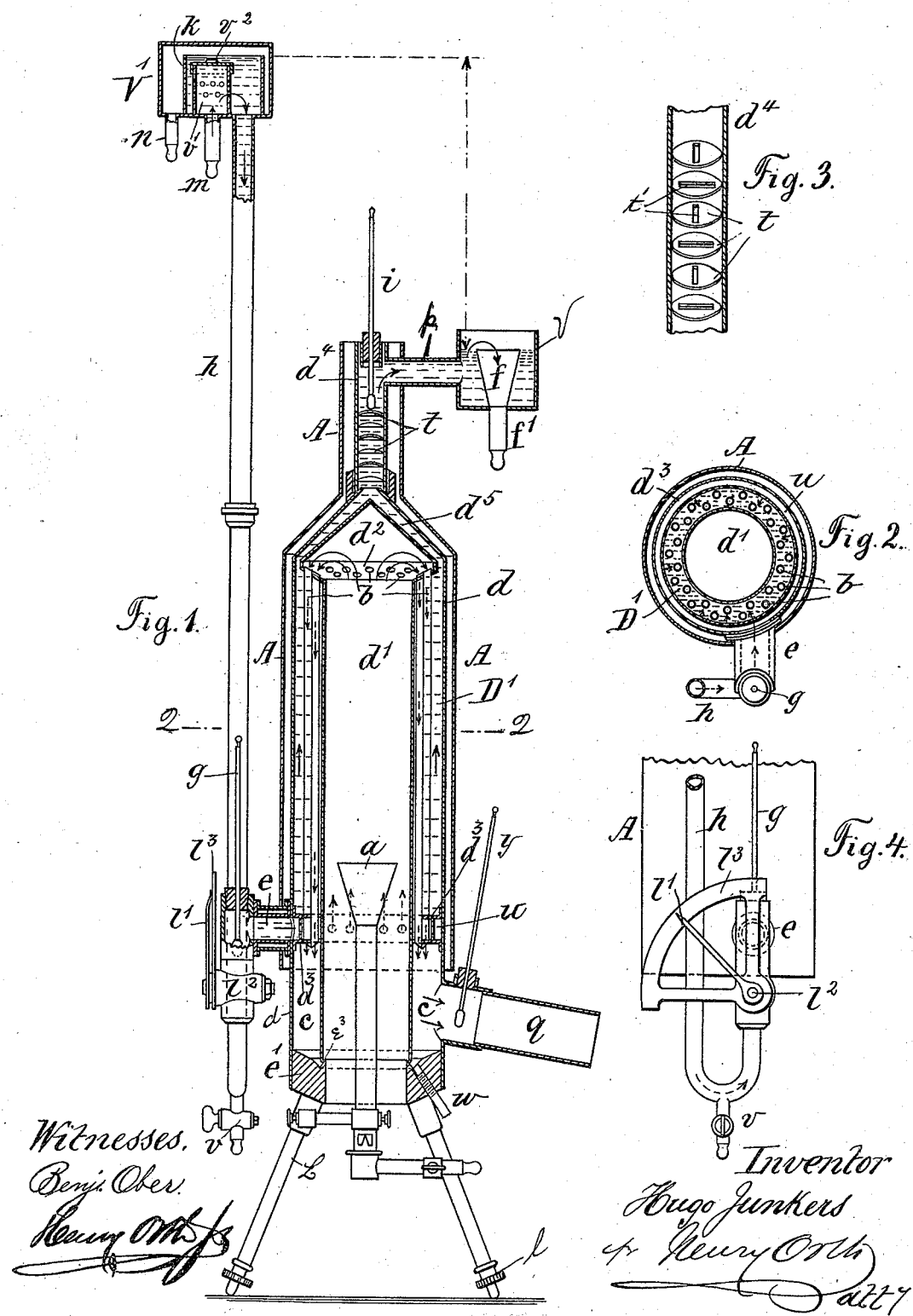

HUGO JUNKERS, OF DESSAU, GERMANY.

CALORIMETER.

SPECIFICATION forming part of Letters Patent No. 555,956, dated March 10, 1896.

Application filed July 30, 1894. Serial No. 518,971. (No model.) Patented in Germany June 29, 1892, No. 71,731; in France July 16, 1892, No. 223,025; in England July 16, 1892, No. 13,083, and in Austria-Hungary September 26, 1893, No. 22,430 and No. 42,080.

*To all whom it may concern:*

Be it known that I, HUGO JUNKERS, a subject of the German Emperor, residing at 22 Antoinettenstrasse, Dessau, Germany, have invented certain new and useful Improvements in Calorimeters, (for which I have obtained Letters Patent in Germany, No.71,731, dated June 29, 1892; in France, No. 223,025, dated July 16, 1892; in Great Britain, No. 13,083, dated July 16, 1892, and in Austria-Hungary, No. 22,430 and No. 42,080, dated September 26, 1893;) and I do hereby declare the following to be a clear and exact description of the invention.

My invention has relation to the art of determining the heating power of a combustible material or substance, and it has for its object the provision of means whereby this may be readily effected at any desired time.

The invention consists in part in a method of determining the heating power of a combustible, and it further consists in the means for carrying out the same.

In determining the heating power of a combustible it has heretofore been the practice to transmit the heat evolved from a given quantity of combustible to a constant quantity of liquid, suitable precautions being taken against loss of heat by radiation; but this mode of operation has the disadvantage in that great care and much time are necessary in order to obtain accurate results, and that a continuous testing of the combustible is impossible. According to my invention the said operation is materially simplified and correct results obtained, and this I accomplish by transmitting the total heat evolved by the combustion of a combustible to be tested—for instance, gas—to a liquid equally flowing, and determining the heating power by measuring the quantity of liquid flowing from the apparatus within a given time—say, *e. g.*, during one revolution of the gas-meter—by measuring the volume of combustible consumed within the same time and by ascertaining the difference in the temperature of the liquid before and after it is acted upon by the caloric. With these data the heating power of the combustible or fuel is readily determined by multiplying the volume of liquid acted upon by the caloric during a given time by the temperature difference thereof and by dividing the product by the volume of combustible consumed during such time.

$$\text{Heating value} = \frac{\text{quantity of liquid} \times \text{difference of temperature}}{\text{quantity of combustible}}.$$

As an example, let it be assumed that the heating power of a combustible gas is to be determined. If one-tenth cubic foot of gas has been consumed in heating 0.9023 kilogram of water in continuous motion flowing to and from the source of heat, and if the temperature of the water flowing to the source of heat is 13.1° centigrade, and from the source of heat is 27.5, or a temperature difference of 27.5−13.1=14.4, we have $\frac{0.9023 \times 14.4}{0.10} = 130$ calories per one cubic foot of gas.

Referring now to the accompanying drawings, Figure 1 is a vertical sectional view of a calorimeter embodying my invention and more particularly designed for testing the heating power of gases. Fig. 2 is a cross-section of the heater, taken on or about on line 2 2 of Fig. 1. Fig. 3 is a sectional detail view of a portion of the outflow for the fluid, the slotted partitions therein being shown in perspective; and Fig. 4 is a side elevation of the lower portion of the heater, showing its connection with the supply-pipe.

The apparatus is supported from legs L, provided with leveling-screws $l$, said legs being secured to a base-ring $e'$, whose inner face is beveled and provided with a circular channel $e^3$, proximate to the inner edge of said ring, to which is also secured the outer shell, $d$, of the heater, whose upper end is conical or pyramidal and opens into a tubular outlet $d^4$. Axially within the heater is arranged a cylindrical open-ended draft-flue $d'$, whose lower edge is seated in the circular channel $e^3$ formed in the base-ring above referred to, whereby a circular heating-chamber D' is formed between said outer shell and inner flue. The lower end of said chamber is closed by a circular flue sheet or ring $d^3$, that has perforations in which the lower end of a series of draft-flues $b$ are seated fluid-tight, said flue-ring being constructed with an annular fluid-channel $u$, to which is connected a jacketed feed-pipe $e$, the inner face of said annular fluid-channel $u$ being provided with perforations, so as to distribute the fluid supplied to the heating-chamber $D'$ as uniformly as possible over the lower area thereof. The upper end of the draft-flue $d'$ is secured to a circular flue sheet or ring $d^2$, connected with a conical or pyramidal partition or head $d^5$, that forms, with the outer shell, a conical or pyramidal channel leading to the outflow-pipe $d^4$.

To the annular chamber or smoke-box $c$, formed between the base-ring $e'$ and flue-ring $d^3$ and between the axial draft-flue $d'$ and the outer shell, $d$, is connected an outlet-pipe $q$, that is provided with a thermometer $y$, by means of which the temperature of the waste gases and products of combustion leaving the apparatus can be ascertained. The base-ring $e'$ is formed as a funnel-shaped channel, to which is connected an outlet-pipe $w$, said channel leading to the circular channel $e^3$, and hence as all the tubular flues $b$ open into the annular chamber $c$, and as the central flue, $d'$, is projecting to the circular channel $e^3$, all water produced by the combustion will collect in channel $e^3$ and flow off through pipe $w$. At the same time the water in channel $e^3$ separates the air outside and inside the draft-flue from one another.

The outflow-pipe $d^4$ is connected by a horizontal pipe $p$ with a vessel V, in which latter is arranged a funnel-shaped overflow-vessel $f$, whose discharge-nozzle $f'$ extends through the bottom of said vessel V.

Within the outflow-pipe $d^4$ are arranged partitions $t$, each provided with central longitudinal slots $t'$, the slots in the successive partitions lying at right angles to one another, as shown in Fig. 3, so as to effect a thorough mixing of the fluid before reaching the thermometer $i$, seated fluid-tight in the upper end of the outflow-pipe. The thermometer $i$ extends into the pipe $d^4$ sufficiently to be at all times immersed in the outflowing fluid.

To prevent radiation of heat from the heater it is provided with a jacket A, that extends from a point some distance below the lower flue-ring, $d^3$, to the upper end of the overflow-pipe $d^4$, as shown in Fig. 1.

The feed-pipe $h$, as more plainly shown in Fig. 4, has its lower end recurved and is provided on its lowest point with a purge-cock $v$. On the upper end of the upward-turned part of this feed-pipe is a stop-cock $l^2$, the plug of which stop-cock is provided with a manipulating-hand $l'$, adapted to travel over a suitably-graduated index $l^3$, whereby the position of the stop-cock is indicated and whereby said position may be adjusted to the desired flow of fluid. A short angular inlet-tube $e$, hereinbefore referred to, with an opening on top connects this cock with the water-chamber and is protected against loss of heat by an air-jacket formed by a second angular tube. A thermometer $g$ is seated in the plug, closing the opening, so that the bulb lies below the inlet branch of the angle-tube and is at all times immersed in the fluid flowing to the heater.

In case a liquid—as water, for instance—is employed as a heat absorbent, in order to obtain the necessary equal pressure to induce its constant flow through the heater the feed-pipe $h$ is extended above said heater sufficiently and has at its upper end a vessel $V'$, within which is arranged a second vessel, $v'$, closed by means of a cover $v^2$, said vessel $v'$ having perforations in its vertical walls some distance above its bottom, and to said vessel $v'$ is connected the feed-pipe $m$.

The vessel $v'$ is contained in an overflow-vessel $k$, of greater height and diameter than the feed-vessel $v$, but of less height and diameter than vessel $V'$, which latter is provided with a discharge-pipe $n$ for the discharge of the overflowing liquid. The object of this arrangement is to counteract all agitation which would otherwise be produced by the inflowing liquid, so that a quiet flow of liquid and a constant pressure-height to the pipe $h$ is obtained.

In practice the area of the heating-surfaces is so chosen that all of the heat evolved at the burner $a$ will be taken up by the fluid flowing through the heater, so that none of the heat evolved at said burner will pass out of the apparatus with the products of combustion; but this may also be regulated by the flow of the fluid through the heater or by regulating the draft and the volume of combustible supplied to the burner, as will be readily understood. Then the temperature of the waste gases being low all water resulting from the combustion will be condensed and, flowing off by the small pipe $w$, will be easily measured, and the heat represented by it can be calculated and subtracted from the heat-value, giving the lower heat-value for those cases where the heat of the combustion-water is not regained. If the temperature of the waste gases would be high, the water of the combustion would escape as steam with the waste gases, and the quantity would be unknown—i. e., the latent heat.

Of course the heater should be protected against loss of heat by radiation, so that all of the heat evolved at the burner and taken up by the fluid flowing through said heater remains in the fluid, and for this reason I provide the heater with an air-jacket.

Accurate measurements are materially assisted by the thorough commingling or mixing of the said fluids, especially at the points where the measurements take place.

As shown, the heater is constructed on the principle of the so-called "counter-current," whereby an efficacious heating of the upwardly-flowing liquid by the downwardly-flowing hot gases and products of combustion is effected. Furthermore, the body of liquid so heated and flowing upwardly through the discharge-pipe $d^4$ is thoroughly commingled during its passage through the slotted partitions $i$ in the outflow-pipe $d^4$.

The construction of the apparatus may be variously modified, according to the degree of precision of the measurements to be obtained.

When once a continuous flow of fluid through the apparatus is established, the measurements may be taken within a few minutes, which is of great value and importance, in view of the tedious determination of the heat-values as effected by apparatus of the usual construction.

Having thus described my invention, what I claim as new therein, and desire to secure by Letters Patent, is—

1. A calorimeter comprising an upright heater having inflow and outflow branches at or near its bottom and top respectively, means for inducing a continuous flow of fluid through said heater, means for burning within the heater the combustible whose heating power is to be determined, regulating devices for regulating the flow of fluid through the heater relatively to the area of its heating-surface, and temperature-indicators in contact with the inflowing and outflowing fluid, respectively, for the purpose set forth.

2. A calorimeter comprising a heater having inflow and outflow branches, means for inducing a continuous flow of fluid through said heater, means for burning within the heater the combustible, the heating power of which is to be determined, a collector within the heater for the water of combustion, provided with an outflow branch, regulating devices for regulating the flow of fluid through the heater relatively to the area of the heating-surface of the latter so as to cause all the heat evolved by the combustible to be absorbed by such fluid, and temperature-indicators in contact with the inflowing and outflowing fluid, for the purpose set forth.

3. A calorimeter comprising an upright heater having inflow and outflow branches at or near its bottom and top respectively, means for inducing a continuous flow of fluid through said heater, appliances interposed between the same and its outflow branch adapted to break up the body of fluid as it flows from the heater to the outflow branch thereof, means for burning within the heater the combustible whose heating power is to be tested, and temperature-indicators in contact with the inflowing and outflowing fluids, for the purpose set forth.

4. A calorimeter comprising an upright heater having inflow and outflow branches at or near its bottom and top respectively, means for inducing a continuous flow of liquid under a constant pressure through the heater, means for burning within the heater the combustible whose heating power is to be tested, and temperature-indicators in contact with the inflowing and outflowing liquid respectively, for the purpose set forth.

5. A calorimeter, comprising an upright tubular heater having an axially-arranged combustion-chamber open to the atmosphere at its lower end and communicating with tubular downtakes at its upper end, said downtakes arranged in a circle between the combustion-chamber and heater-shell, a smoke-box below the heater, and an outlet-flue connected with said smoke-box; in combination with a valved feed and an outflow pipe connected with the heating-chamber of the heater at or near the lower and upper end of said chamber, respectively, and thermometers for and connected with the feed and outflow pipes and the draft-outlet flue, for the purpose set forth.

6. In a calorimeter, the combination with the heater-shell $d$ and its axial combustion-chamber $d'$, of a supporting-ring, as $e'$, having its upper face inclined inwardly and provided with an annular channel proximate to its inner periphery, and with a purge-channel leading to said annular channel the lower end of said heater-shell being secured to the supporting-ring and the lower end of said axial combustion-chamber extending into the said annular channel, for the purpose set forth.

7. In a calorimeter, the combination with the heater-shell $d$, its lower flue-ring, and the axial combustion-chamber $d'$, both shell and combustion-chamber extending below said flue-ring; of the base-ring $e'$ with which said shell and combustion-chamber are connected, and the outlet-pipe $q$ connected with the heater-shell at a point between the base-ring $e'$ and lower flue-ring, for the purpose set forth.

8. In a calorimeter, the combination with a heater provided with a vertical outflow-pipe; of slotted partitions arranged in said pipe, from distance to distance, the slots in the successive partitions being arranged at right angles to one another, for the purpose set forth.

9. A calorimeter comprising a vertical tubular heater provided with a perforated feed-duct at its lower end, a valved stand-pipe connected with said feed-duct, an overflow-vessel at the upper end of said pipe, an outlet-pipe at the upper end of the heater, a series of slotted partitions in said pipe, the slots in the successive partitions being arranged at right angles to one another, an overflow-vessel connected with said exhaust-pipe, and thermometers for and connected with the feed and outflow pipe and with the draft-flue of the heater, for the purpose set forth.

10. A calorimeter comprising an upright heater having inflow and outflow branches at or near its bottom and top respectively, and appliances for breaking up the body of fluid flowing to and from said heater after such fluid has left the inflow branch and before it reaches the outflow branch, for the purpose set forth.

11. The mode of determining the heat values or calories of combustibles, which consists in causing the heat evolved from a definite volume of such to act upon a definite volume of a fluid continuously flowing under a constant pressure to and from the source of heat, ascertaining the difference in the temperature of the fluid before and after being acted upon by the heat, multiplying the volume of fluid acted upon by the heat by said temperature difference, and dividing the products by the volume of combustible consumed.

12. The mode of determining the heating power of combustibles, which consists in causing the total heat of a definite quantity or volume of a combustible to be absorbed by a definite quantity or volume of a fluid in continuous motion to and from the source of heat, and determining the value of the heat absorbed by such fluid through the medium of the difference between its initial and final temperatures, substantially as set forth.

13. The mode of determining the heating power of combustibles, which consists in causing the total heat evolved by the constant and uniform combustion of a definite quantity or volume of a combustible to be absorbed by a definite quantity or volume of a fluid flowing under uniform constant pressure to and from the source of heat, and determining the value of the heat absorbed by such fluid through the medium of the difference between its initial and final temperatures, substantially as set forth.

14. The method of determining the heating power of combustibles, which consists in causing the total heat evolved from a definite quantity or volume of combustible to be absorbed by a definite quantity or volume of a fluid in continuous motion to and from the source of heat, ascertaining the difference in the temperature of the fluid before and after heating, and multiplying the volume of fluid heated by said temperature difference, substantially as set forth.

In testimony whereof I have hereto affixed my signature in presence of two witnesses.

HUGO JUNKERS.

In presence of—
  GEO. LOUBIER,
  RICHARD SCHMIDT.